(12) United States Patent
Iwanaga et al.

(10) Patent No.: US 8,476,865 B2
(45) Date of Patent: Jul. 2, 2013

(54) CONTROL DEVICE AND METHOD FOR CHARGE CONTROL

(75) Inventors: Takehito Iwanaga, Kobe (JP); Ryuichi Kamaga, Nissin (JP)

(73) Assignees: Fujitsu Ten Limited, Kobe-Shi (JP); Toyota Jidosha Kabushiki Kaisha, Toyota (JP)

( * ) Notice: Subject to any disclaimer, the term of this patent is extended or adjusted under 35 U.S.C. 154(b) by 302 days.

(21) Appl. No.: 13/123,324

(22) PCT Filed: Aug. 28, 2009

(86) PCT No.: PCT/JP2009/065117
§ 371 (c)(1),
(2), (4) Date: Apr. 8, 2011

(87) PCT Pub. No.: WO2010/044317
PCT Pub. Date: Apr. 22, 2010

(65) Prior Publication Data
US 2011/0193532 A1    Aug. 11, 2011

(30) Foreign Application Priority Data
Oct. 14, 2008  (JP) .................................. 2008-264845

(51) Int. Cl.
*H02J 7/14* (2006.01)
*H02J 7/00* (2006.01)

(52) U.S. Cl.
USPC ............ 320/104; 320/128; 320/132; 320/134; 320/136; 320/137; 903/903; 903/904; 903/907; 180/65.21; 180/65.27; 180/65.275; 180/65.28

(58) Field of Classification Search
CPC .................................................. Y02T 10/7005
USPC .......................................................... 320/104
See application file for complete search history.

(56) References Cited

FOREIGN PATENT DOCUMENTS

| JP | A 6-343202 | 12/1994 |
|---|---|---|
| JP | A 6-343205 | 12/1994 |
| JP | A 10-304582 | 11/1998 |
| JP | A 11-205909 | 7/1999 |

OTHER PUBLICATIONS

Nov. 8, 2011 Office Action issued in Japanese Patent Application No. 2008-264845 (with translation).
"Ace Charging System (Advanced Conductive EV Charging System)," Tesla Motors, Specification # 98-000141-00, 2006.

(Continued)

*Primary Examiner* — Edward Tso
*Assistant Examiner* — Ahmed Omar
(74) *Attorney, Agent, or Firm* — Oliff & Berridge, PLC

(57) ABSTRACT

A device controls charging a battery with power supplied from a power supply located outside of a vehicle through a charge cable. The device includes a first microcomputer and a second microcomputer. The first microcomputer is configured to turn on a charge mode signal upon detecting a change in a pilot signal output through the charge cable, and to turn off the charge mode signal when a charge completion signal output from the second microcomputer is turned off. The second microcomputer is configured to charge the battery through the charge cable when the charge mode signal is turned on, and to turn off the charge completion signal when the charging is complete. When the charge completion signal is turned on at the time of the first microcomputer turning off the charge mode signal due to sudden fluctuations, the charge mode signal is turned on again.

8 Claims, 9 Drawing Sheets

OTHER PUBLICATIONS

"General Requirements for Electric Vehicle Conductive Charging System," Japan Electric Vehicle Association Standard (Japanese Electric Vehicle Standard), Mar. 29, 2001. (with partial English-language translation).

International Search Report issued in PCT/JP2009/065117, mailed Nov. 17, 2009. (with English-language translation).

Written Opinion issued in PCT/JP2009/065117, mailed Nov. 17, 2009. (with partial English-language translation).

CONTROL DEVICE AND METHOD FOR CHARGE CONTROL

This application is the U.S. national phase of international application PCT/JP2009/065117, filed on Aug. 28, 2009, which designated the U.S. and claims priority to JP Application No. 2008-264845 filed on Oct. 14, 2008. The entire contents of these applications are incorporated herein by reference.

TECHNICAL FIELD

The present invention relates to a control device for charging an on-board, vehicle-driving battery and to a method for controlling charging of the battery.

BACKGROUND ART

As vehicles in which environmentally-friendly zero-emissions from cars are taken into consideration in society as well as governments, electric vehicles, petrol-electric hybrid vehicles, fuel-cell vehicles, and the like are the obvious answer in recent years. In each of these vehicles, an electric motor to generate a driving force and a battery to store power to be fed to the electric motor are mounted. On hybrid vehicles, internal combustion engines are mounted as driving force together with an electric motor, and on fuel-cell vehicles, fuel cells are mounted as direct current power supply for driving the vehicles.

Some of known vehicles with on-board, such vehicle-driving batteries are capable of charging the batteries directly from owner's home electrical power supplies. For example, power is supplied from a general household power supply to a battery through a charge cable connected between an outlet of a commercial power supply provided with a house and a charge port provided with a vehicle. The vehicle that is capable of charging an on-board battery directly from a power supply located outside the vehicle will be referred to as a "plug-in vehicle".

The specifications of plug-in vehicles are specified, in the United States of America, as "SAE electric vehicle conductive charge coupler" (non-patent document 1), and specified, in Japan, as "General Requirements for Conductive Charging System for Electric Vehicles" (non-patent document 2).

In "SAE electric vehicle conductive charge coupler" and "General Requirements for Conductive Charging System for Electric Vehicles", the specifications of a control pilot are specified as one example.

The control pilot is defined as a control line that connects between a control circuit of EVSE (Electric Vehicle Supply Equipment), which supplies power from wiring in facilities to vehicles, and a grounded portion of a vehicle via a control circuit of the vehicle, and a pilot signal transmitted via this control line is used as a basis on which to determine the connecting state of a charge cable, the propriety of an power supply from a power supply to a vehicle, the rated current of EVSE, and the like.

PRIOR-ART DOCUMENTS

Patent Document

[Patent document 1] Japanese Patent Application Laid-Open No. 10-304582.

Non-patent Document

[Non-patent document 1] "SAE Electric Vehicle Conductive Charge Coupler" (the United States), SAE Standards, SAE International, November 2001.

[Non-patent document 2] "General Requirements for Electric Vehicle Conductive Charging System," Japan Electric Vehicle Association Standard (Japanese Electric Vehicle Standard), Mar. 29, 2001.

SUMMARY OF THE INVENTION

Problems to be Solved by the Invention

A device to control charging of an on-board battery includes a microcomputer that functions as a power control unit and a microcomputer that functions as a charge control unit.

Upon detection of an "on-edge" state, which is a change from an unchanging state lasting for a predetermined period of time, of a control pilot signal, i.e., upon detection of an "on edge" of a control signal output from a signal generating unit that is a control circuit incorporated in a charge cable, the microcomputer functioning as a power control unit activates the charge control unit to turn on a charge mode signal to be output to the charge control unit, while turning off the charge mode signal when a charge completion signal output from the charge control unit is turned off.

When the charge mode signal output from the power control unit is turned on, the microcomputer functioning as charge control unit charges the on-board battery with power supplied from an outside power supply via the charge cable. When the charging is finished, the microcomputer turns off the charge completion signal to be output to the power control unit.

Still, if some sudden fluctuations occur such as application of noise signals to a reset terminal of the microcomputer functioning as the power control unit, the power control unit turns off the charge mode signal. This causes the inconvenience that the charge control unit, upon detecting that the charge mode signal is turned off, ends the charging of the battery halfway, even when the charging is not completed.

In view of the above-mentioned problems, an object of the present invention is to provide a control device and a method for charge control that can complete battery charging by charge control unit even when some abnormality occurs to a power control unit.

Means for Solving the Problems

According to one aspect of the present invention, a device controls charging of a battery with power supplied from a power supply located outside a vehicle via a charge cable. The device includes a first microcomputer and a second microcomputer. The first microcomputer is configured to receive a signal transmitted from a signal generating unit in the charge cable and corresponding to a state of power supply from the outside power supply, configured to turn on a charge mode signal when the signal changes from an unchanging state lasting for a predetermined period of time, configured to turn off the charge mode signal upon detecting that a charge completion signal output from the second microcomputer is turned off, and configured to turn on again the charge mode signal when the first microcomputer turns off the charge mode signal before detecting that the charge completion signal is turned off. The second microcomputer is configured to charge the battery based on power supplied from the outside power supply via the charge cable upon detecting the charge mode signal that is turned on by the first microcomputer, and configured to turn off the charge completion signal when the charging is completed.

While the battery is being charged by the second microcomputer, if the situation that the first microcomputer turns off the charge mode signal takes place due to some cause, the second microcomputer completes the charging of the battery.

However, even in such a case, if the first microcomputer detects that the charge mode signal is turned off before the charge completion signal is turned off by the second microcomputer, i.e., before the charging is completed, the first microcomputer turns on again the charge mode signal, so that the charging of the battery is performed again by the second microcomputer.

Effect of the Invention

Thus, the control device according to the embodiment of the present invention is capable of completing the charging of the battery by the charge control unit even when some abnormality occurs on the power control unit.

MODES FOR CARRYING OUT THE INVENTION

Description will be given below with regard to a control device and a method for charge control according to embodiments of the present invention, as applied to a plug-in vehicle.

Figure 1:
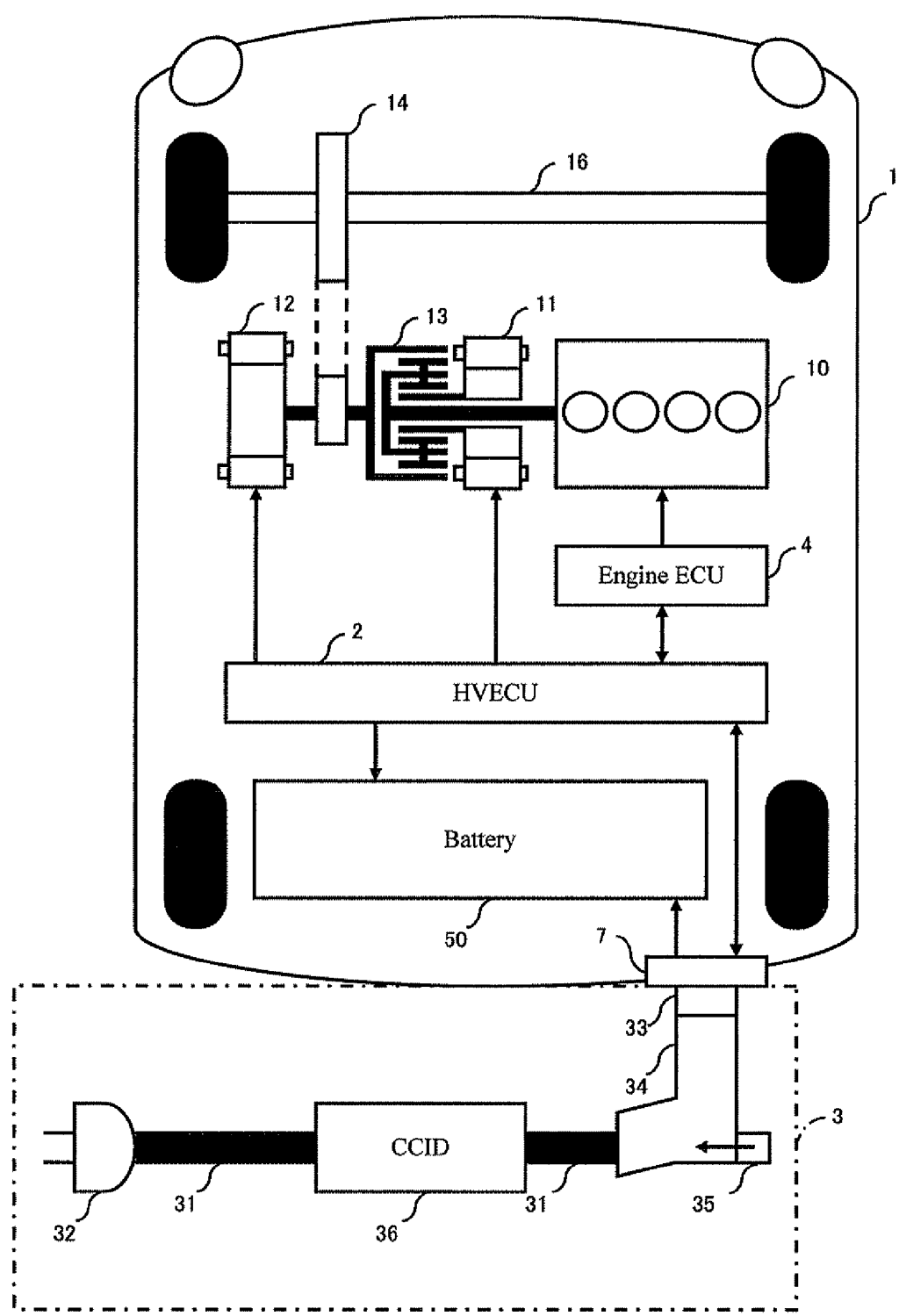
FIG. 1 is a diagram illustrating the general arrangement of a plug-in hybrid vehicle according to an embodiment of the present invention.

FIG. 1 shows a hybrid vehicle 1 (hereinafter referred to as "plug-in hybrid vehicle") as one example of a plug-in vehicle that is capable of charging its on-board high voltage battery 50 directly from a power supply provided outside the vehicle. The plug-in hybrid vehicle 1 includes an engine 10 as driving force, a first MG (Motor Generator) 11, and a second MG (Motor Generator) 12.

The engine 10, the first MG 11, and the second MG 12 are coupled to a power separating mechanism 13 to ensure that the plug-in hybrid vehicle 1 can run on driving power from at least one of the engine 10 and the second MG 12.

The first MG 11 and the second MG 12 respectively include an alternate current rotary electric machine, non-limiting examples including a three-phase alternate current synchronous rotary machine of a U phase coil, a V phase coil, and a W phase coil.

The power separating mechanism 13 includes a sun gear, pinion gears, a carrier, and a ring gear, with the pinion gears engaged between the sun gear and the ring gear of which constitutes a planetary gear mechanism.

The carrier that makes the pinion gear automatically revolve and is coupled to a crank shaft of the engine 10. The sun gear is coupled to a rotation shaft of the first MG 11. The ring gear is coupled to a rotation shaft of the second MG 12 and a decelerator 14.

Figure 2:
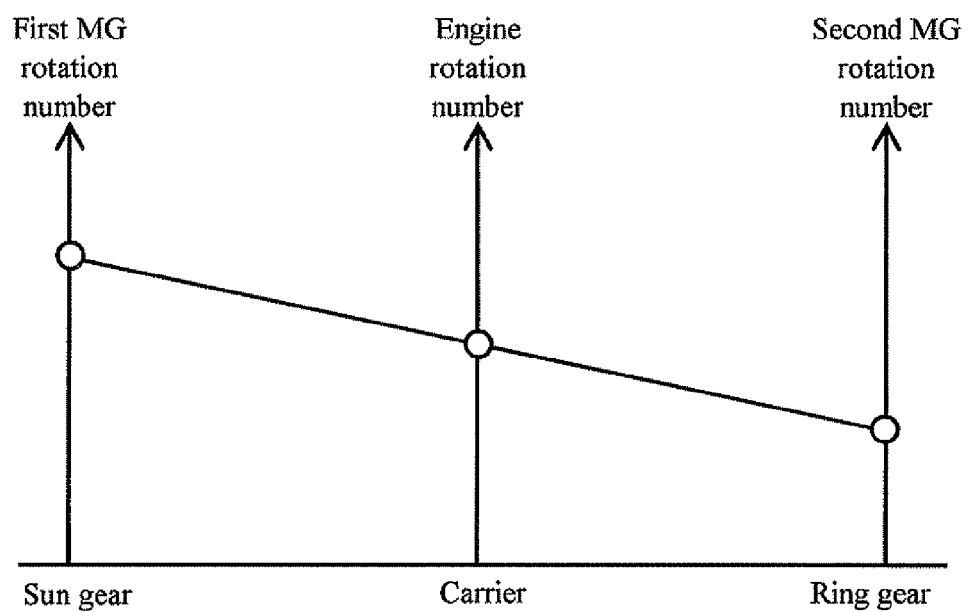
FIG. 2 is a collinear diagram of a power separating mechanism.

As shown in FIG. 2, in the planetary gear mechanism, if the number of rotations of random two among the sun gear, the ring gear, and the carrier is determined, the number of rotations of the remaining one is determined uniquely. Accordingly, the respective numbers of rotations of the engine 10, the first MG 11, and the second MG 12 are correlated with each other such that the respective numbers of rotations are connected with a straight line on a collinear diagram.

Figure 3:
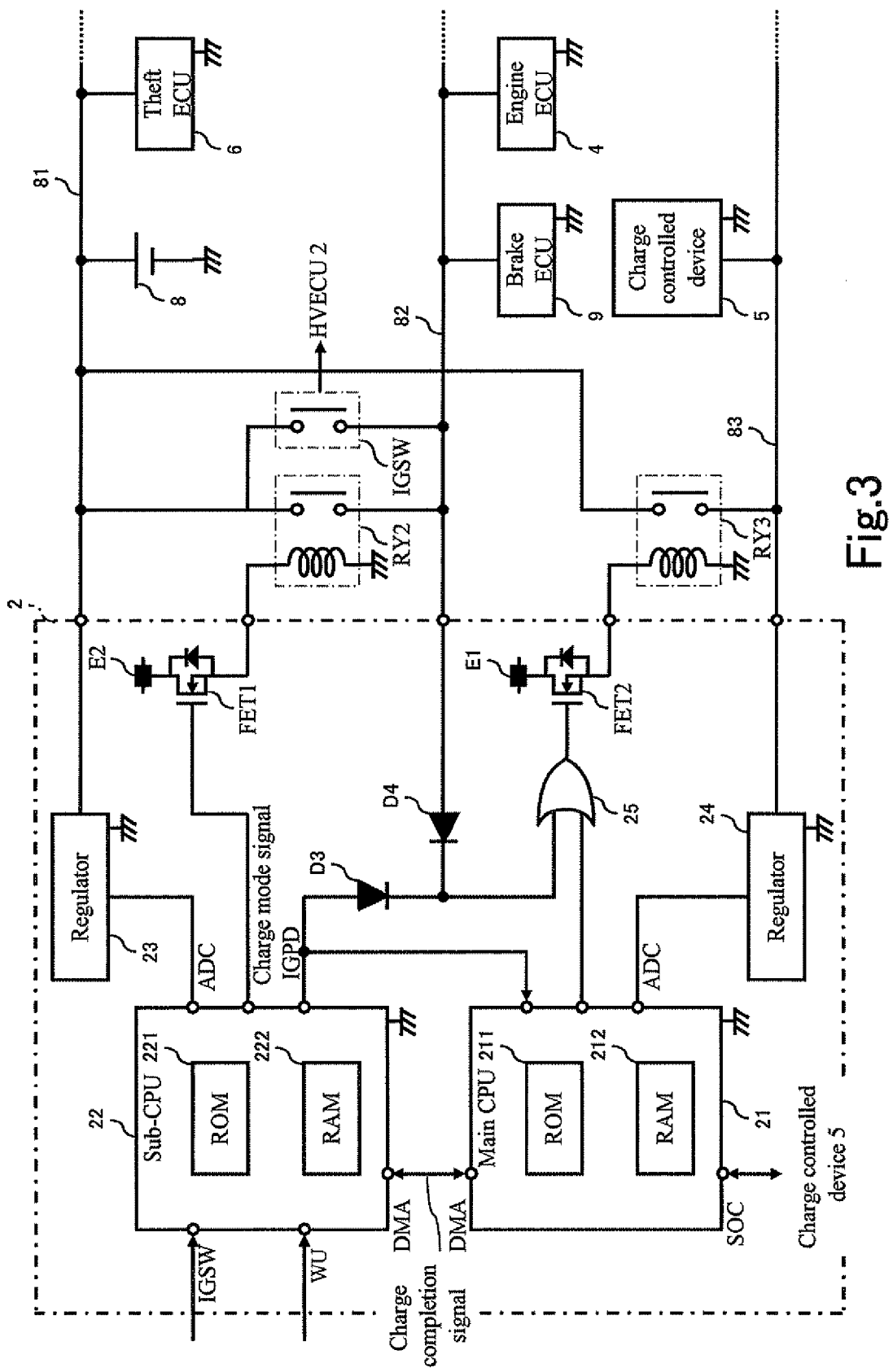
FIG. 3 is a diagram illustrating the general arrangement of a control device provided in the plug-in hybrid vehicle shown in FIG. 1.

As shown in FIG. 3, the plug-in hybrid vehicle 1 includes a plurality of electronic control units (hereinafter referred to as "ECUs"), such as a hybrid vehicle ECU (hereinafter referred to as "HVECU") 2, as a multiple power control of the vehicle, an engine ECU 4 that controls the engine 10, a brake ECU 9 that controls a braking mechanism, a theft prevention ECU 6 that realizes a theft prevention function. The plug-in hybrid vehicle 1 also includes charge controlled device 5 that conducts charging of the battery 50 based on the charge control of the HVECU 2, described later.

Each of the ECUs incorporates a single microcomputer or a plurality of microcomputers in each having a CPU, a ROM, and a RAM.

In order to feed power to each ECU, the plug-in hybrid vehicle 1 includes three power feeding systems of a first power feeding system 81, a second power feeding system 82, and a third power feeding system 81 that are fed by a low voltage battery 8 (for example, DC 12 V).

The first power feeding system 81 is directly fed from the low voltage battery 8 even when an ignition switch IGSW is in "off" state, The first power feeding system 81 is coupled with ECUs of a body monitoring system, such as the theft prevention ECU 6, and the HVECU 2.

The second power feeding system 82 is fed from the low voltage battery 8 via a power supply relay RY2 when the ignition switch IGSW is in "on" state. The second power feeding system 82 is coupled with ECUs to control power train systems, such as the engine ECU 4 and the brake ECU 9, and with ECUs to control body systems such as wipers and door mirrors.

The third power feeding system 83 is fed from the low voltage battery 8 via a power supply relay RY3. The third power feeding system 83 is coupled with ECUs relating to the charge control of the battery 50, such as the HVECU 2 and the charge controlled device 5.

The ECUs of power train system and the ECUs of charging system are mutually coupled via a CAN (Controller Area Network) bus. The ECUs of body system are mutually coupled via a LIN (Local Interconnect Network) bus. The CAN bus and the LIN bus are mutually coupled via a gate way. That is, the ECUs can exchange necessary control information via these communication buses.

Each ECU includes a DC regulator to produce a control voltage on a predetermined level (for example, DC 5 V) using the direct current voltage of DC 12 V fed from the low voltage battery 8. The output voltage of the DC regulator is fed to a control circuit provided in each ECU, such as a microcomputer.

The HVECU 2 controls the state of power fed from the low voltage battery 8 through the second power feeding system 82 and the third power feeding system 83 based on operation for the ignition switch IGS.

The HVECU 2 includes a first microcomputer incorporating a sub-CPU 22 that functions as a power control unit and a second microcomputer incorporating a main CPU 21 that functions as a running control unit and charge control unit.

The first and second microcomputers respectively include ROMs 211 and 221 in which respective control programs are stored, and RAMs 212 and 222 used as working areas during respective control operations.

Further, the first microcomputer and the second microcomputer respectively include a DMA controller to ensure the CPUs 21 and 22 to interactively read information stored in RAMs 212 and 222. The first microcomputer and the second microcomputer are coupled via a DMA communication line that enables them to communicate with each other via the DMA controllers. In this respect, the main CPU 21 includes a nonvolatile memory to evacuate important control data from RAM when the power supply is turned off.

The sub-CPU 22 is always fed by the first power feeding system 81 via a regulator 23. When the ignition switch IGSW is turned on while the power supply relay RY2 is turned off, the sub-CPU 22 turns on a field-effect transistor (hereinafter referred to as "FET") FET1 to turn on the power supply relay RY2. These initiates feeding of the second power feeding system 82 from the low voltage battery 8, thus maintaining the power feeding state.

When the power supply relay RY2 is turned on, the ECUs coupled to the second power feeding system 82 are activated to execute respective, expected control actions.

When the power feeding from the second power feeding system 82 starts, a high level control signal is input from the second power feeding system 82 to one input terminal of an OR circuit 25 via a diode D4.

In this respect, the high level signal output from the OR circuit 25 turns on a FET 2, which turns on the power supply relay RY3. This starts power feeding from the low voltage battery 8 to the third power feeding system 83 as well.

Accordingly, when the ignition switch IGSW is turned on, the main CPU 21 is activated by being fed by the third power feeding system 83 via a regulator 24.

Upon detecting that the ignition switch IGSW is turned off while the power supply relay RY2 is closed, the sub-CPU 22 transmits via the CAN bus an indication that the ignition switch IGSW is turned off to urge shutdown processing of the ECUs coupled to the second power feeding system 82.

When the main CPU 21 acknowledges via the CAN bus the completion of the shutdown processing of the ECUs and completes the main CPU 21's own shutdown processing, at the same time, the main CPU 21 turns off the power supply relay RY2 via the sub-CPU 22 and thus stops the power feeding to the second power feeding system 82.

The shutdown processing refers to stop processing for various kinds of driving actuators, evacuation processing to save control data into a memory, and the like processing in association with the ignition switch IGSW turning into "off" state. For example, in the case of the engine ECU 4, the shutdown processing includes stop processing for the engine 10 and saving processing to evacuate engine control data including various kinds of learning data, such as an air-fuel ratio, into a nonvolatile memory.

After turning off the power supply relay RY2, the sub-CPU 22 shifts to standby state that is a low power consumption mode. The "standby state" refers to a state in which the CPU has executed a stop order or a hold order.

When an ignition switch IGSW signal is input to an interrupt terminal PIG of the sub-CPU 22 in standby state, the sub-CPU 22 returns to normal operation state from standby state, turns on the FET 1, and turns on the power supply relay RY2. That is, the ignition switch IGSW signal serves as a wakeup signal to return the sub-CPU 22 in standby state to normal state.

The ignition switch IGSW may be any types of a momentary switch and an alternate switch. In the case where a momentary switch is employed, the HVECU 2 may hold a current situation as flag data in the RAM and determine, based on the flag data, whether the momentary switch is turned on or off, upon an operation edge of the switch. Alternatively, the ignition switch IGSW may be a conventional switch with a key that is inserted into a key cylinder to be on and off by rotation of it.

Description will be given in detail with regard to the running control of the vehicle by the HVECU 2 performed after the ignition switch IGSW is turned on. After the ignition switch IGSW is turned on and the power supply relay RY2 is closed, the HVECU 2 conducts the running control of the vehicle based on an accelerator operation or other operation by a driver.

The HVECU 2 monitors the state of charge (hereinafter referred to as "SOC (State Of Charge)) of the battery 50 via the charge controlled device 5. For example, when the SOC is lower than a predetermined value, the HVECU 2 activates the engine 10 via the engine ECU 4 and accumulates the power generated by the first MG 11, which is driven via the power separating mechanism 13, into the battery 50.

Specifically, the power generated by the first MG 11 is converted from an alternate current to a direct current at an inverter 17, and the voltage of the power is adjusted at a converter 15. Then, the power is accumulated in the battery 50. In this respect, a part of the power generated by the engine 10 is transmitted to drive wheels 16 via the power separating mechanism 13 and the decelerator 14.

When the SOC is within a predetermined range, the HVECU 2 drives the second MG 12 by using at least one of the power accumulated in the battery 50 and the power generated by the first MG 11, and thus assists the power of the engine 10. The drive force of the second MG 12 is transmitted to the drive wheels 16 via the decelerator 14.

Further, when the SOC becomes higher than a predetermined value, the HVECU 2 stops the engine 10 via the engine ECU 4 and drives the second MG 12 by using the power accumulated in the battery 50.

At the time of the braking of the vehicle or similar situations, the HVECU 2 controls the second MG 12 driven by the drive wheels 16 via the decelerator 14 as a generator, and accumulates the power generated by the second MG 12 into the battery 50. In other words, the second MG 12 is used as a regeneration brake to convert the braking energy to power.

That is, the HVECU 2 controls the engine 10, the first MG 11, and the second MG 12 based on torque required by the vehicle, the SOC of the battery 50, and other parameters.

While in FIG. 1 the front wheels assume the drive wheels 16 driven by the second MG 12, the rear wheels may assume the drive wheels 16 in place of the front wheels, or both the front wheels and the rear wheels may assume the drive wheels 16.

The high voltage battery 50 is a chargeable and dischargeable, direct current power supply and includes, for example, a secondary battery such as a nickel-hydride battery and a lithium-ion battery. The voltage of the battery 50 is, for example, about 200 V. The battery 50 is chargeable with power supplied from a power supply located outside the vehicle, in addition to power generated by the first MG 11 and the second MG 12.

As the battery 50, it is possible to employ a capacitor with a large capacity. The battery 50 is not limited to any kind and structure insofar as the battery 50 serves as a power buffer that temporarily accumulates power generated by the first MG 11 and the second MG 12 and power supplied from a power supply located outside the vehicle, and feeds the accumulated power to the second MG 12.

Figure 4:
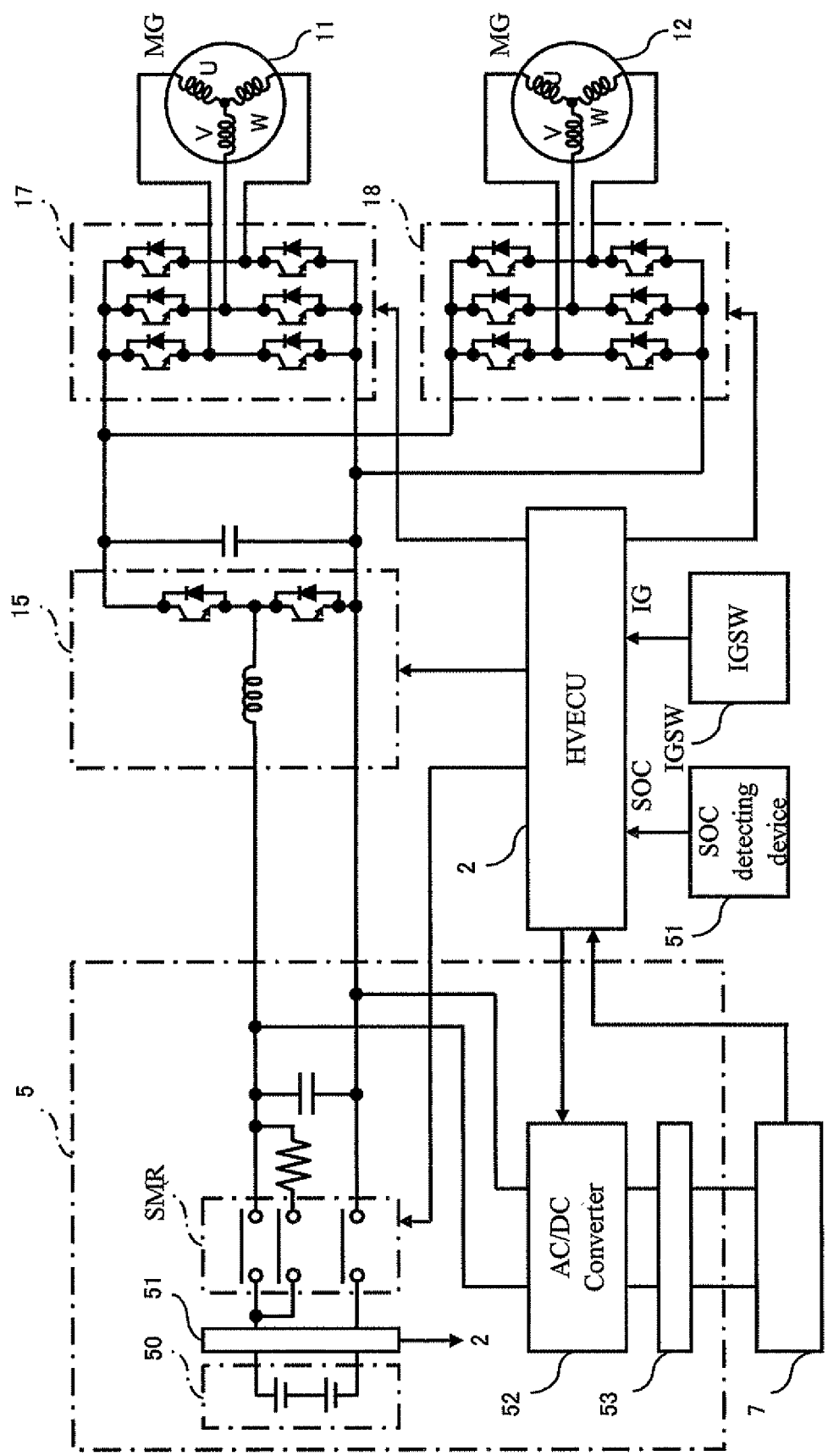
FIG. 4 is a schematic diagram of a control device and a controlled device relating to charge control of a battery.

As shown in FIG. 4, the high voltage battery 50 is coupled to the converter 15 via a system main relay SMR, and the output voltage is adjusted to a predetermined direct current voltage at the converter 15. Then, the adjusted output voltage is converted into an alternate current voltage at the first inverter 17 or the second inverter 18, and then the alternate current voltage is applied to the first MG 11 or the second MG 12.

The converter 15 includes a reactor, two npn type transistors serving as power switching elements, and two diodes. The reactor is coupled to the positive electrode side of the battery 50 at one end and to the connection node between the two npn type transistors at the other end. The two npn type transistors are coupled in series, and the two diodes are connected in anti-parallel to the respective npn type transistors.

Preferable examples of the npn type transistors include an IGBT (Insulated Gate Bipolar Transistor). Further, in place of the npn type transistor, a power switching element such as a power MOSFET (Metal Oxide Semiconductor Field-Effect Transistor) may be used.

The first inverter 17 includes a U phase arm, a V phase arm, and a W phase arm that are coupled in parallel with each other. Each phase arm includes two npn type transistors that are coupled in series, and diodes are coupled in anti-parallel to the respective npn type transistors. A connection node between the two npn type transistors constituting each of the three phase arms is coupled to the tip of the coil corresponding to the first MG.

The first inverter 17 converts direct current power fed from the converter 15 into alternate current power and feeds the alternate current power to the first MG 11. Alternatively, the first inverter 17 converts alternate current power generated by the first MG 11 into direct current power and feeds the direct current power to the converter 15.

The second inverter 18 is configured similarly to the first inverter 17, and a connection node between two npn type transistors constituting each of three phase arms is coupled to the tip of the coil corresponding to the first MG.

The second inverter 18 converts direct current power fed from the converter 15 into alternate current power and feeds the alternate current power to the second MG 12. Alternatively, the second inverter 18 converts alternate current power generated by the second MG 12 into direct current power and feeds the direct current power to the converter 15.

When the ignition switch IGSW is turned on, the HVECU 2 controls the first MG 11 and the second MG 12 based on an accelerator operation or other operations by a driver.

For example, the HVECU 2 controls the power switching elements of the converter 15 to raise the output voltage of the battery 50 to a predetermined level, and controls the phase arms of the second inverter 18 to drive the second MG 12.

For example, the HVECU 2 controls the phase arms of the first inverter 17 to convert power generated by the first MG 11 into direct current power, and lowers the voltage at the converter 15 to charge it with the battery 50.

As shown in FIG. 1 and FIG. 4, the plug-in hybrid vehicle 1 includes a charge inlet 7 to connect the vehicle to a power supply outside the vehicle in order to feed charge power to the battery 50. While in FIG. 1 the charge inlet 7 is arranged at the rear side of the vehicle body, the charge inlet 7 may be arranged at the front side of the vehicle body.

The charge controlled device 5 includes an SOC detecting device 51 that detects the SOC of the battery 50 and outputs a detection signal to the HVECU 2, a system main relay SMR that performs open/close control of connection to the battery 50, an LC filter 53 that eliminates noise from the alternate current power supplied from the outside of the vehicle, and an AC/DC converter 52 that converts the alternate current power supplied from the outside of the vehicle into direct current power.

The power supplied from the outside of the vehicle via a charge cable 3 is converted into, direct current power by the AC/DC converter 52 being a charge circuit via the LC filter 54, and thereafter, is charged into the high voltage battery 50.

The charge cable 3 includes, at one end, a plug 32 to be coupled to an outlet of an outside power supply such as a commercial power supply installed in a house, and, at the other end, an attachment 34 equipped with a connector 33 to be coupled to the charge inlet 7.

Figure 5:
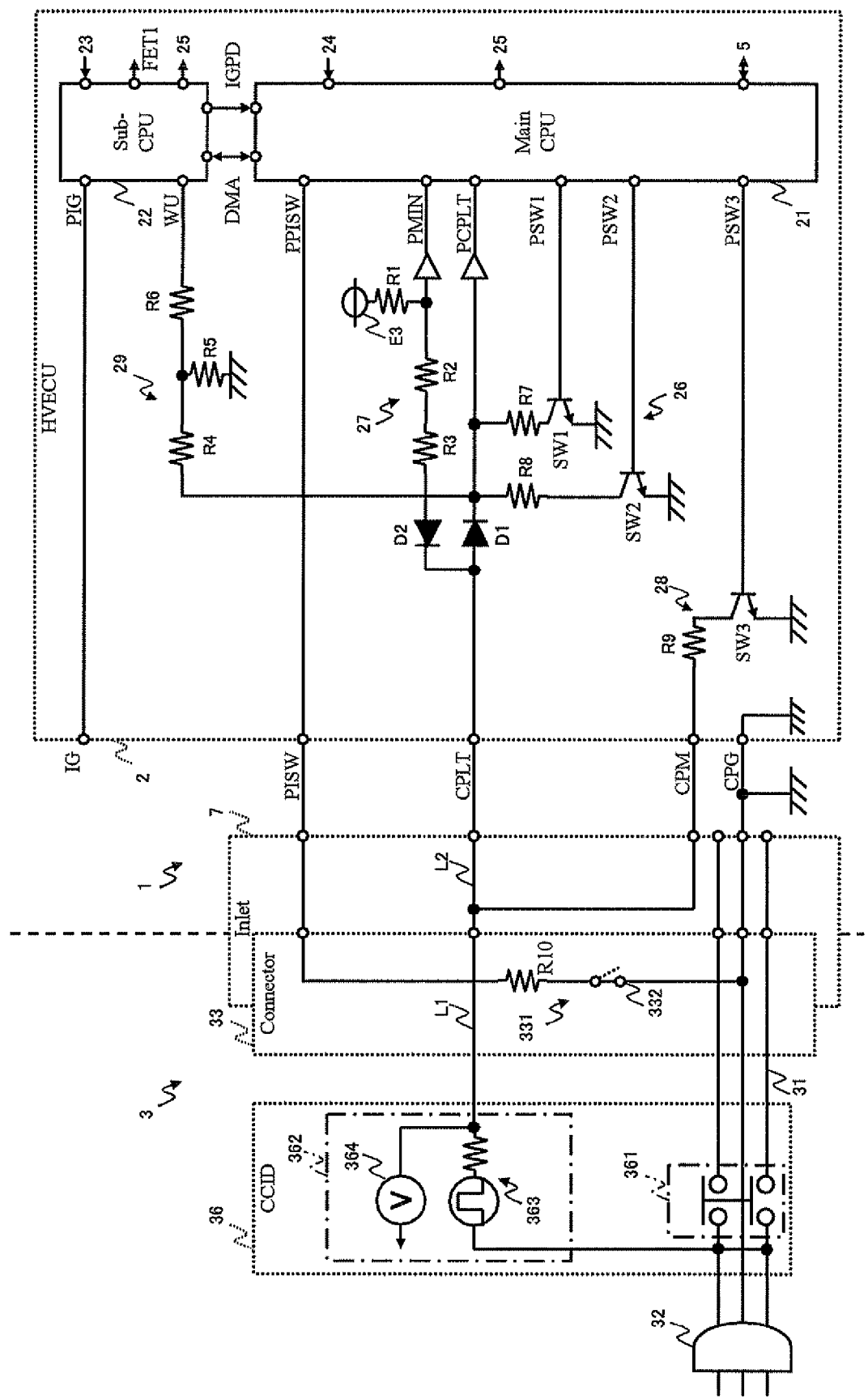
FIG. 5 is a circuit diagram illustrating details of the control device relating to the charge control of the battery shown in FIG. 4.

As shown in FIG. 1 and FIG. 5, the charge cable 3 includes a power cable 31 that supplies alternate current power from a commercial power supply; and a CCID (Charging Circuit Interrupt Device) 36. The CCID 36 incorporates a relay 361 to stop or relay the supply of the alternate current power via the power cable 31, and a signal generating unit 362.

The signal generating unit 362 includes circuit blocks including an oscillator 363 that produces a pulse signal (hereinafter referred to as "control pilot signal" or "CPLT signal") representing a rated current of the power cable 31, and a voltage detector 364 that detects the signal level of the control pilot signal. These circuit blocks respectively incorporate a CPU, a ROM, a RAM, and the like that work with the aid of the power supplied from the outside power supply.

The control pilot signal output from the signal generating unit 362 corresponds to the state of power supply from the outside power supply, and as such, is used to execute a series of charging processing between the CCID 36 and the HVECU 2.

The connector 33 incorporates a connection determining circuit 331 that includes a switch 332 that is grounded at one end and a resistor R10 that is coupled in series to the switch 332. The output of the connection determining circuit 331 is input into the HVECU 2 as a cable connection signal PISW.

The attachment 34 includes a mechanical lock mechanism that prevents detachment of the connector 33 inserted into the charge inlet 7, and an operation unit 35 composed of an operation button to release the lock mechanism.

To detach the connector 33 of the charge cable 3 from the charge inlet 7, the operation button is pressed to release the lock mechanism, whereby the connector 33 is detached. When the operation button is pressed, the switch 332 of the connection determining circuit 331 turns into "off" state in conjunction with the operation of the operation button, while when pressing of the operation button is released, the switch 332 returns to "on" state.

As shown in FIG. 5, the connector 33 of the charge cable 3 includes terminal pins of a pair of power lines coupled to the power cable 31, a ground terminal pin, a terminal pin of a signal line L1 to output the control pilot signal, and a terminal pin of a cable connection signal line that is output from the connection determining circuit 331.

The charge inlet 7 includes a plurality of terminal pins to be coupled to the respective terminal pins provided on the connector 33 and a wiring-disconnection detecting terminal pin that is short-circuited with the control pilot signal terminal.

The wiring-disconnection detecting terminal pin is a signal pin used to detect wiring disconnection or short circuit of a signal line L2 of the vehicle side to which the control pilot signal is transmitted.

As shown in FIG. 5, the HVECU 2 includes a first interface circuit 26, a second interface circuit 27, and a wiring-disconnection/short-circuit detecting circuit 28 as peripheral circuits of the main CPU 21.

The first interface circuit 26 includes a buffer circuit that inputs a control pilot signal input via a diode D1; a first step-down circuit that includes a resistor R7 and a switch SW1 and that lowers the signal level of the control pilot signal; and a second step-down circuit that includes a resistor R8 and a switch SW2.

The main CPU 21 detects the signal level of the control pilot signal output from the charge inlet 7 via the buffer circuit of the first interface circuit 26 and changes the signal level into two stages using the first step-down circuit and/or the second step-down circuit.

The second interface circuit 27 includes resister circuits (R1, R2, and R3) and a buffer circuit that input a low level signal to the main CPU 21 when the signal level of the control pilot signal input via the diode D2 is on a minus level, while inputting a high level control signal to the main CPU 21 when the signal level of the control pilot signal is on a plus level.

The main CPU 21 detects the low level of the control pilot signal via the buffer circuit of the second interface circuit 27.

The wiring-disconnection/short-circuit detecting circuit 28 is coupled to the wiring-disconnection detecting terminal pin and includes a switch SW3 to ground the wiring-disconnection detecting terminal pin via the resister R9.

The main CPU 21 controls the switch SW3 so as to detect wiring disconnection or short circuit of the signal line L2 of the vehicle side.

As described above, the sub-CPU 22, having returned to normal operating state from standby state upon turning on of the ignition switch IGSW, turns on the power supply relay RY2 to activate the main CPU 21. The sub-CPU 22 then outputs a control signal to the main CPU 21 indicating that the ignition switch IGSW is turned on.

The main CPU 21 controls the engine 10, the first MG 11, and the second MG 12 based on the above-described torque required for the vehicle, the SOC of the battery 50, and other parameters, and conducts the running control of the vehicle.

In this respect, after detecting a cable connection signal PISW output from the connection determining circuit 331, when the main CPU 21 determines that the charge cable 3 is not connected, then the main CPU 21 switches on or off the switch SW3 of the wiring-disconnection/short-circuit detecting circuit 28 so as to discriminate whether the signal line L2 of the vehicle side is disconnected or short-circuited.

Figure 6:
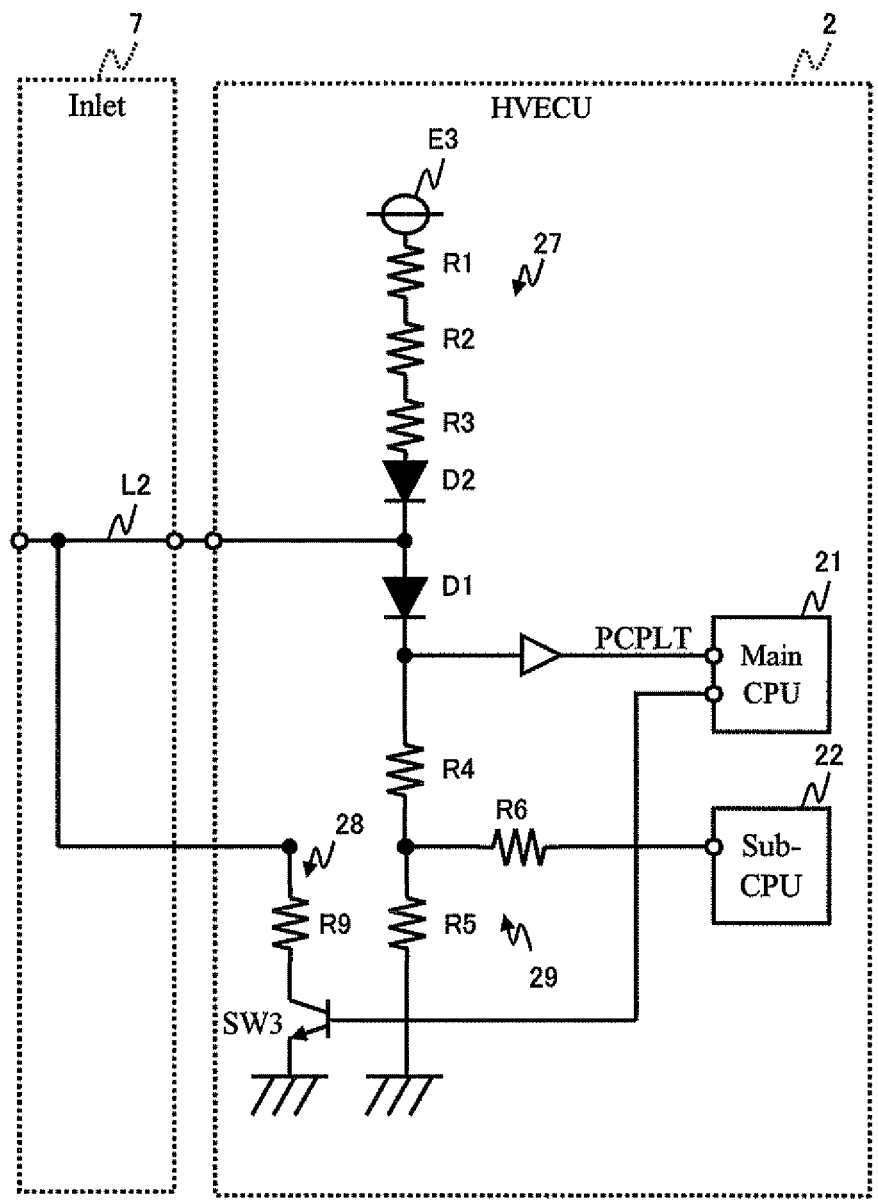
FIG. 6 is a circuit diagram of a peripheral circuit relating to detection control of wiring disconnection or short circuit of a signal line.

As shown in FIG. 6, on condition that the signal line L2 is normal, when the switch SW3 is turned off, the resisters R4 and R5 cause a high level voltage on a current passage along which a current flows from the power supply to a grounded portion of the vehicle through the resisters R1, R2, and R3, the diodes D2 and D1, and the resisters R4 and R5, and then the high level voltage caused by the resisters R4 and R5 is input to the main CPU 21.

If the signal line L2 is short-circuited, when the switch SW3 is turned off, a low level voltage is input to the main CPU 21.

Further, on condition that the signal line L2 is normal, when the switch SW3 is turned on, the resister R9 causes a low level voltage on a current passage along which a current flows from the power supply to the grounded portion of the vehicle through the resisters R1, R2, and R3, the diode D2, the resister R9, and the switch SW3, and then the low level voltage caused by the resister R9 is input to the main CPU 21.

If the signal line L2 is disconnected, even when the switch SW3 is turned on, a high level voltage is input to the main CPU 21.

When the voltage value of the signal line L2 is on a high level when the switch SW3 is turned off and when the voltage value of the signal line L2 is on a low level when the switch SW3 is turned on, then the main CPU 21 determines that the signal line L2 is normal.

Further, when the voltage value of the signal line L2 is on a low level when the switch SW3 is turned off, the main CPU 21 determines that the signal line L2 is short-circuited, and when the voltage value of the signal line L2 is on a high level when the switch SW3 is turned on, the main CPU 21 determines that the signal line L2 is disconnected.

On condition that the signal line L2 is normal, plug-in charge processing, described later, is permitted, while if the signal line L2 is not appropriate, the plug-in charge processing is prohibited and an emergency light is on.

The resister R9 is a protective resister of the switch SW3 and is set to a sufficiently low resistance value.

The HVECU 2 conducts the above-described running control of the vehicle at the time of turning on of the ignition switch IGSW, while conducting plug-in charge control, i.e., charge control of the battery 50 via the charge cable 3 at the time of turning off of the ignition switch IGSW.

As shown in FIG. 5, the HVECU 2 includes an edge detecting circuit 29 as a peripheral circuit of the sub-CPU 22.

The edge detecting circuit 29 includes resisters R4, R5, and R6 to detect a rising edge (hereinafter referred to as an "on edge") of the control pilot signal. The output of the edge detecting circuit 29 is coupled to a wake-up interrupt terminal WU of the sub-CPU 22.

Figure 7:
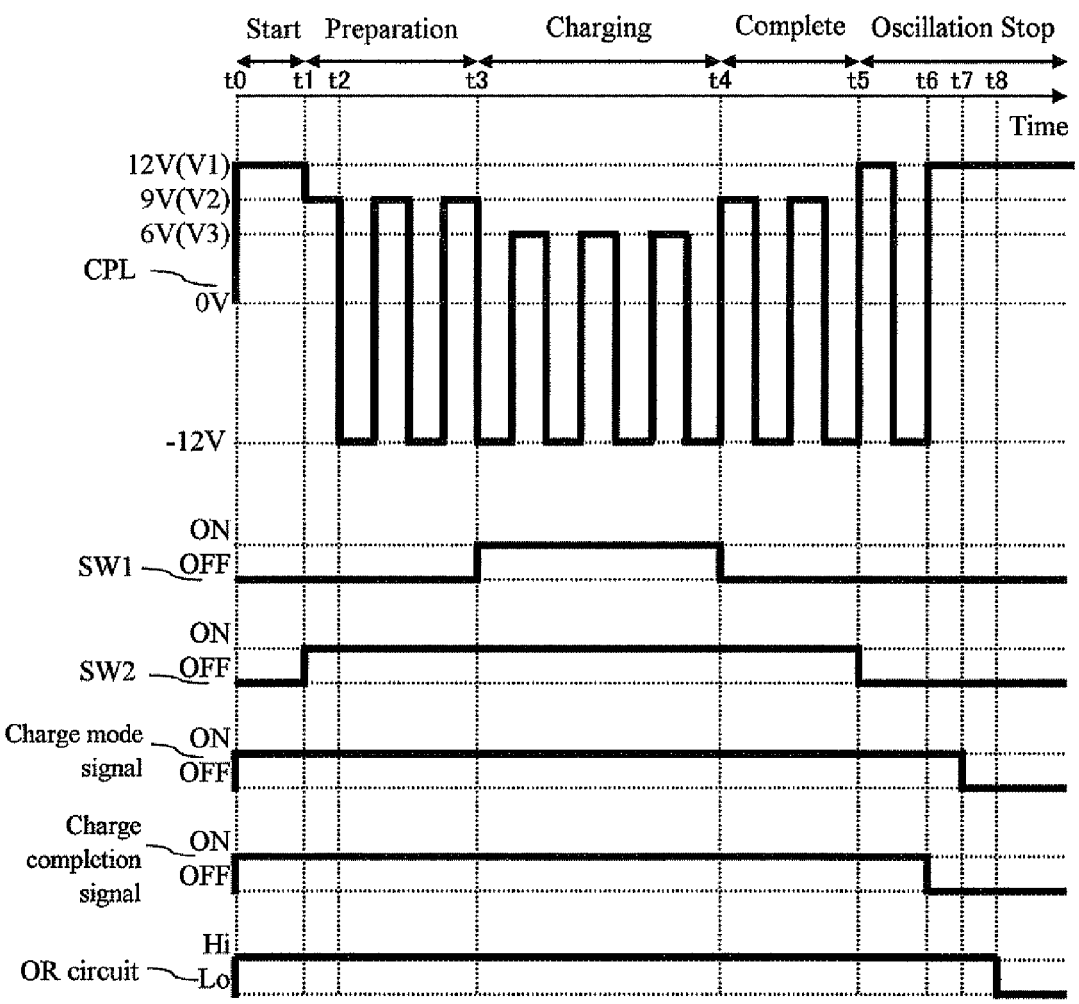
FIG. 7 is a timing chart of a control signal and a switch relating to charge control of the battery.

As shown in FIG. 3, FIG. 5, and FIG. 7, when the plug 32 of the charge cable 3 is coupled to the outlet of the outside power supply and the connector 33 of the charge cable 3 is attached to the charge inlet 7 with the sub-CPU 22 in standby state, then the signal generating unit 362 outputs a control pilot signal of a direct current voltage V1 (for example, +12 V) (at time t0 in FIG. 7).

The sub-CPU 22 returns to normal operating state from standby state when the control pilot signal with the direct current voltage V1 is input to the interrupt terminal WU via the signal lines L1 and L2 after a predetermined period of time when no control pilot signal is input to the interrupt terminal WU, and when the level of signal input to the interrupt terminal WU changes.

That is, the sub-CPU 22 wakes up upon occurrence of an "on edge" of a signal input into the interrupt terminal WU.

When the sub-CPU 22 that has woken up with the "on edge" of the control pilot signal outputs a high level control signal to one input terminal of the OR circuit 25, the OR circuit 25 outputs an output signal so as to turn on the FET 2, which in turn turns on the power supply relay RY3.

When power feeding via the power supply relay RY3 to the loads coupled to the third power feeding system 83 starts, the main CPU 21 is activated.

In this respect, when the sub-CPU 22 memorizes an "on" state charge mode signal in the RAM 222, the charge mode signal is DMA-transmitted to the main CPU 21 as a signal to request execution of charge control. Upon detecting the signal, the main CPU 21 outputs a high level signal to one input terminal of the OR circuit 25 so as to maintain the "on" state of the power supply relay RY3.

It is noted that the control signal output from the sub-CPU 22 to the OR circuit 25 may be detected by the main CPU 21 as the charge mode signal.

Successively, upon detecting that the charge mode signal is in "on" state, the main CPU 21 turns on a charge completion signal indicating that "the charge control is underway".

The main CPU 21 DMA-transmits the state of the charge completion signal to the sub-CPU 22 at predetermined intervals via a DMA controller. Upon receipt of the "on" state charge completion signal from the main CPU 21 via the DMA controller, the sub-CPU 22 memorizes the state of the charge completion signal in the RAM 222.

The main CPU 21 starts charge control of the battery 50 via the charge controlled device 5.

When at time t1 the main CPU 21 detects the voltage V1 (+12 V) of the control pilot signal, the main CPU 21 turns on the switch SW2 of the second step-down circuit so as to lower the voltage level of the control pilot signal from V1 to V2 (for example, +9 V).

When at time t2 the signal generating unit 362 detects via the voltage detector 364 that the signal level of the control pilot signal is lowered from V1 to V2, the signal generating unit 362 outputs a pulse signal generated in the oscillating section 363 with a predetermined duty cycle and a predetermined frequency (for example, 1 KHz) as the control pilot signal.

It is noted that while the signal level of the control pilot signal output from the signal generating unit 362 is ±V1, the upper limit level is lowered to V2 by the second step-down circuit provided in the HVECU 2.

Figure 8A:
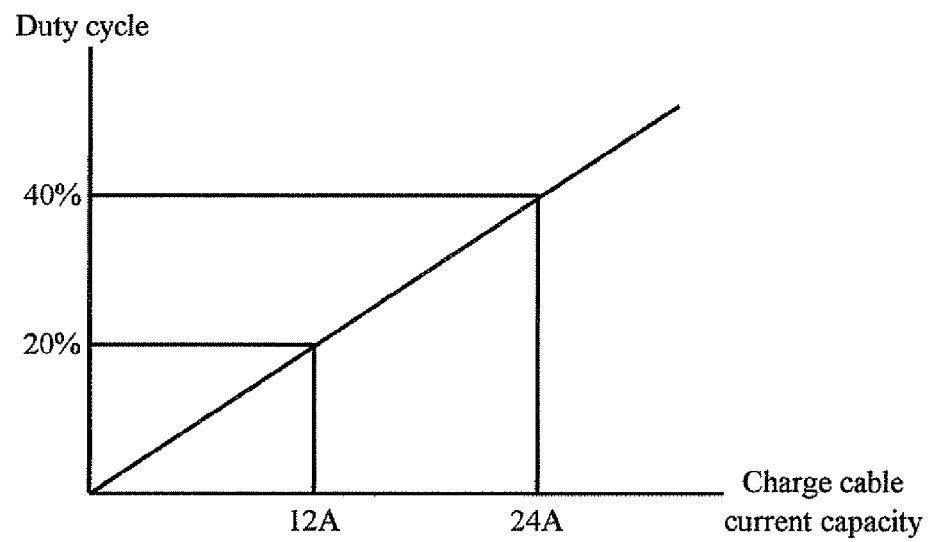
FIG. 8A is a diagram illustrating a duty cycle relative to a current capacity charge cable.
Figure 8B:
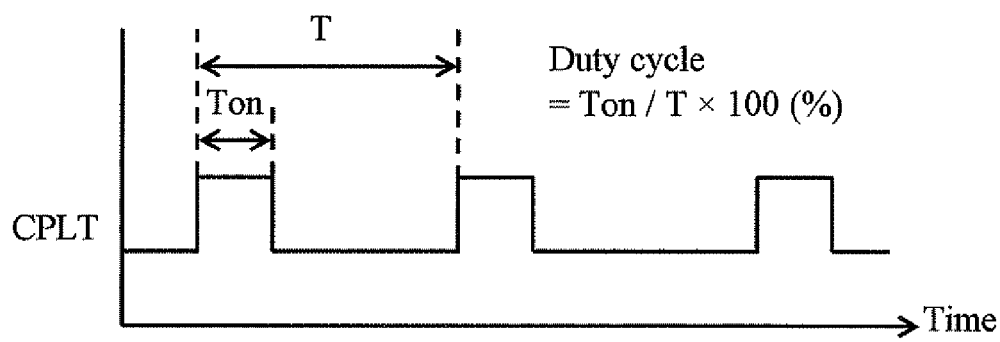
FIG. 8B is a waveform diagram of a pilot signal generated by a signal generating unit.

As shown in FIGS. 8A and 8B, the duty cycle of the control pilot signal is a value set based on a capacity of current that can be supplied from the outside power supply to the vehicle via the charge cable 3, and the duty cycle is set in advance on an individual charge cable basis. For example, the duty cycle is set at 20% for a charge cable with a current capacity of 12 A, and at 40% for a charge cable with a current capacity of 24 A.

Referring back to FIG. 7, the main CPU 21 detects the duty cycle of the control pilot signal and acknowledges the current capacity of the charge cable 3. Then at time t3, the main CPU 21 closes the system main relay SMR (see FIG. 4), turns on the switch SW1 of the first step-down circuit with the switch SW2 of the second step-down circuit in "on" state, and lowers the voltage level of the control pilot signal from V2 to V3 (for example, +6 V).

Upon detecting that the signal level of the control pilot signal is lowered from V2 to V3, the signal generating unit 362 turns on the relay 361 to supply alternate current power from the power cable 31 to the vehicle side.

The main CPU 21, thereafter, conducts charge control of the battery 50 by controlling the AC/DC converter 52 (see FIG. 4) based on, for example, the SOC input via the SOC detecting device 51 provided in the charge controlled device 5.

When at time t4 the main CPU 21 detects that the SOC of the battery 50 reaches the predetermined level, the main CPU 21 executes charge completing processing. This will be described in more detail below.

The main CPU 21 stops the AC/DC converter 52 and opens the system main relay SMR (see FIG. 4). Further, the main CPU 21 turns off the switch SW1 of the first step-down circuit to raise the voltage level from V3 to V2.

Upon detecting that that the control pilot signal is raised from V3 to V2, the signal generating unit 362 turns off the relay 361 so as to stop supply of the alternate current power to the vehicle side.

The main CPU 21, at time t5, turns off the switch SW2 of the second step-down circuit so as to return the level of the control pilot signal to the initial level of V1. After waiting for the oscillation of the control pilot signal to be stopped by the signal generating unit 362, the main CPU 21, at time t6, sets the charge completion signal to "off" state, memorizes charge completion signal in the RAM 212, and DMA-transmits the charge completion signal to the sub-CPU 22.

When at time t7 the sub-CPU 22 detects that the charge completion signal input from the main CPU 21 is in "off" state, the sub-CPU 22 switches the charge mode signal to a low level, outputs the charge mode signal to the OR circuit 25, and memorizes the state of the charge mode signal in the RAM 222.

Upon detecting that that the charge mode signal is switched to the low level, the main CPU 21 executes shutdown processing.

Upon completion of the shutdown processing, the main CPU 21, at time t8, outputs a low level control signal to the OR circuit so as to turn off the power supply relay RY3.

Thus, the sub-CPU 22 and the main CPU 21 exchange the charge mode signal and the charge completion signal so as to execute a series of charge processing.

In summary, first, when the sub-CPU 22 detects a rising of the control pilot signal, the sub-CPU 22 wakes up from standby state and turns on the charge mode signal so as to activate charge processing in the main CPU 21.

Next, upon detecting that the charge mode signal is turned on, the main CPU 21 turns on the charge completion signal, transmits the charge completion signal to the sub-CPU 22, and charges the high voltage battery. Upon completion of the charging, the main CPU 21 turns off the charge completion signal and transmits the charge completion signal to the sub-CPU 22.

Finally, upon detecting that the charge completion signal is turned off, the sub-CPU 22 turns off the charge mode signal and shifts to standby state.

However, the following problems may occur if, while the main CPU 21 is charging the high voltage battery, an error occurs to DMA communication to cause abnormality such as failure to detect the charge completion signal input from the main CPU 21 with predetermined intervals, and an instantaneous stop of the power supply voltage.

If the above abnormality occurs, the sub-CPU 22 turns off the charge mode signal and then shifts to standby state. The main CPU 21, upon detecting that the charge mode signal is turned off, interrupts the charge processing.

That is, the main CPU 21 turns off the switch SW1 of the first step-down circuit to raise the voltage level from V3 to V2, and further, turns off the switch SW2 of the second step-down circuit to return the level of the control pilot signal to the initial level of V1. Then, the main CPU 21 executes the shutdown processing to turn off the power supply relay RY3.

As a result, the signal level of the control pilot signal is maintained at the direct current voltage V1, whereby the charge processing is not performed thereafter.

Plus, the power supply voltage of the main CPU 21 is instantaneously stopped, the signal output from the main CPU 21 to the OR circuit 25 is also turned off, thereby turning the power supply relay RY3 into "off" state. This is the case where the charge processing is not performed thereafter as well.

In view of this, when the above abnormality returns to normal after some period of time, the sub-CPU 22 confirms the state of the charge completion signal memorized in the RAM 222. Upon detecting that the state of the charge completion signal is set "on", the sub-CPU 22 determines that the charging is not completed yet, in which case the sub-CPU 22 turns on again the charge mode signal.

If the charge mode signal is turned on again by the sub-CPU 22, the main CPU 21 turns on the charge completion signal to start again the charging of the high voltage battery.

That is, the HVECU 2, which includes the above-described first microcomputer and second microcomputer, constitutes the control device of the embodiment of the present invention.

The first microcomputer receives a signal that is transmitted from the signal generating unit 362 provided in the charge cable 3 and that is corresponding to a state of power supply from an outside power supply; turns on the charge mode signal when the signal changes from an unchanging state lasting for a predetermined period of time; turns off the charge mode signal upon detecting that the charge completion signal output from the second microcomputer is turned off; and turns on again the charge mode signal when the first microcomputer turns off the charge mode signal before detecting that the charge completion signal is turned off.

The second microcomputer, upon detecting the charge mode signal that is turned on by the first microcomputer, charges the battery based on power supplied from an outside power supply via a charge cable, and turns off the charge completion signal when the charging is completed.

Another embodiment will be described below.

If abnormality occurs such as the sub-CPU 22 turning off the charge mode signal while the main CPU 21 is charging the high voltage battery, the main CPU 21 may control the sub-CPU 22 to turn on the charge mode signal again.

This will be described in details. The main CPU 21, upon detecting that the charge mode signal is turned off by the sub-CPU 22, determines whether the high voltage battery is being charged or complete charging confirmed, based on whether the charge completion signal memorized in the RAM 212 is in "on" state.

When the charge completion signal is in "on" state, the main CPU 21 determines that the charging is underway. Then, the main CPU 21 temporarily turns off the switch SW3 provided in the wiring-disconnection/short-circuit detecting circuit 28, and thereafter, turns on the switch SW3.

Turning off the switch SW3 changes the voltage of the control pilot signal input to the sub-CPU 22 to a low level. Then, turning on the switch SW3 raises the voltage of the control pilot signal to V1.

The main CPU 21 repeats such switching control of the switch SW3 for predetermined times.

In the meantime, when the sub-CPU 22 that has returned from abnormality detects an "on edge" of the control pilot signal, the charge mode signal is turned on again, and the charge control is resumed.

The period of time from when the switch SW3 is turned off until the switch SW3 is turned on again, and the number of times of repeating turning on/off the switch SW3 may be set appropriately.

Figure 9:
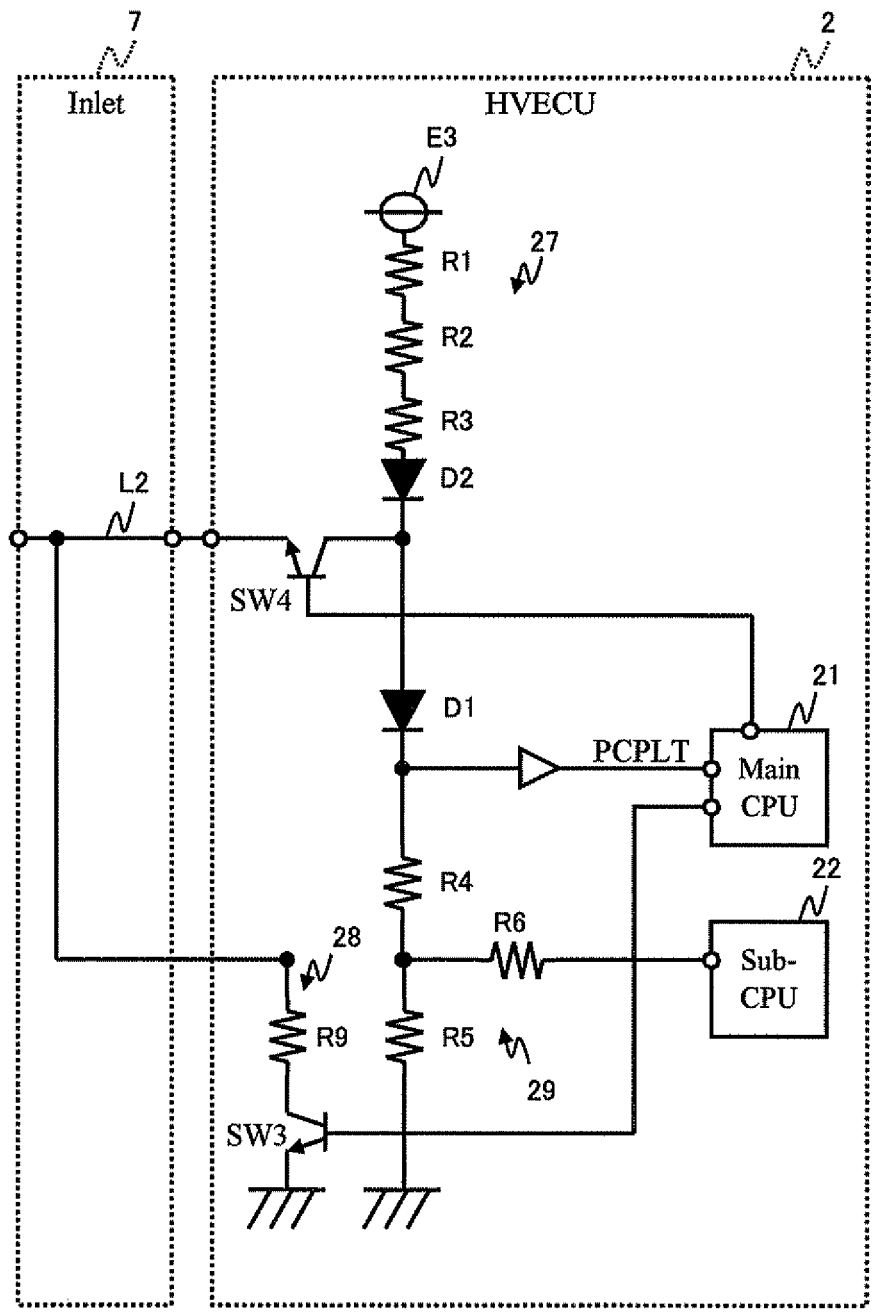
FIG. 9 is a circuit diagram of a switch circuit for generating an "on-edge" state according to another embodiment of the present invention.

While in this embodiment the switch SW3 of the wiring-disconnection/short-circuit detecting circuit 28 is used to raise the control pilot signal, it is possible to couple a switch SW4 to the signal line L2 as shown in FIG. 9 so that turning off the switch SW4 secures switching of the voltage level of the signal line L2.

The charge completion signal memorized in the RAM 222 of the sub-CPU 22 and the charge completion signal memorized in the RAM 212 of the main CPU 21 may be stored in a nonvolatile memory.

Further, while the description in the above-described embodiment is with regard to a series/parallel hybrid vehicle in which the power of the engine 10 is separated by the power separating mechanism 13 and transmitted to the drive wheels 160 and the first MG 11, the present invention is applicable to other types of hybrid vehicles.

For example, the present invention is applicable to what we called series hybrid vehicles in which the engine 10 is used only to drive the first MG 11 and only the second MG 12 generates the vehicle driving force; hybrid vehicles in which among the motion energy generated by the engine 10, only the regeneration energy is recovered as electric energy; and "electric motor assist" hybrid vehicles using the engine 10 as main power while electric motor being used as auxiliary energy, if needed.

Further, the present invention is applicable to electric vehicles without an engine 10 and only with an electric motor that runs on electricity, and to fuel battery-powered vehicles that additionally include electricity-storage batteries.

The above-described embodiments are intended only by way of example, and modifications and variations may be made to the circuit configurations and control configurations of the units and sections without departing from the scope of the present invention.

DESCRIPTION OF REFERENCE NUMERALS

1: plug-in hybrid vehicle
2: HVECU (control device)
3: charge cable
5: charge controlled device
7: charge inlet
8: low voltage battery
10: engine
11: first MG (Motor Generator)
12: second MG (Motor Generator)
13: power separating mechanism
14: decelerator
15: converter
16: drive wheel
17: first inverter
18: second inverter
21: main CPU
22: sub-CPU
23: regulator (first power feeding system)
24: regulator (third power feeding system)
25: OR element (HVECU)
26: first interface circuit (HVECU)
27: second interface circuit (HVECU)
28: wiring-disconnection/short-circuit detecting circuit (switch circuit)
29: edge detecting circuit (HVECU)
31: power cable
32: plug
33: connector
35: operation unit
36: CCID (Charging Circuit Interrupt Device)
50: battery
51: SOC detecting device
52: AC/DC converter 53: LC filter
331: connection determining circuit (connector)
332: switch (connector)
361: relay (CCID)
362: signal generating unit (CCID)
363: oscillator (signal generating unit)
364: voltage detector (signal generating unit)
IGSW: ignition switch
L2: signal line (vehicle side)
PISW: cable connection signal
RY2: power supply relay (second power feeding system)
RY3: power supply relay (third power feeding system)
SMR: system main relay (charge controlled device)
SW1: switch (first step-down circuit)
SW2: switch (second step-down circuit)
SW3: switch (wiring-disconnection detecting circuit)
WU: interrupt terminal ("on edge" signal)

The invention claimed is:

1. A device to control charging of a battery with power supplied from a power supply located outside a vehicle via a charge cable, the device comprising:
a first microcomputer configured to receive a signal that is transmitted from a signal generating unit in the charge cable and that is corresponding to a state of power supply from the outside power supply, configured to turn on a charge mode signal when the signal changes from an unchanging state lasting for a predetermined period of time, configured to turn off the charge mode signal upon detecting that a charge completion signal output from a second microcomputer is turned off, and configured to turn on again the charge mode signal when the first microcomputer turns off the charge mode signal before detecting that the charge completion signal is turned off; and
the second microcomputer configured to charge the battery based on power supplied from the outside power supply via the charge cable upon detecting the charge mode signal that is turned on by the first microcomputer, and configured to turn off the charge completion signal when the charging is complete.

2. The device to control charging of a battery according to claim 1, wherein the first microcomputer comprises a memory to memorize a state of the charge completion signal, and is configured to turn on again the charge mode signal upon detecting that the charge completion signal memorized in the memory is in "on" state after the charge mode signal is turned off.

3. The device to control charging of a battery according to claim 1, wherein upon detecting that the charge completion signal is in "on" state after the charge mode signal is turned off by the first microcomputer, the second microcomputer is configured to drive a switch circuit to switch a state of the signal output from the signal generating unit.

4. The device to control charging of a battery according to claim 3,
wherein the switch circuit is configured to couple, to a grounded portion of the vehicle, a signal line for the signal output from the signal generating unit, and
wherein the second microcomputer is configured to change a signal state of an "on" state signal output from the signal generating unit from "off" state to "on" state via the switch circuit.

5. The device to control charging of a battery according to claim 4, wherein the switch circuit additionally serves as an abnormality detecting circuit comprising a switch to detect wiring disconnection or short circuit of the signal line when the charge cable is not connected to the vehicle.

6. A method for controlling charging of a battery with power supplied from a power supply located outside a vehicle via a charge cable, the method comprising:
controlling a first microcomputer to receive a signal that is transmitted from a signal generating unit in the charge cable and that is corresponding to a state of power supply from the outside power supply, to turn on a charge mode signal when the signal changes from an unchanging state lasting for a predetermined period of time, to turn off the charge mode signal upon detecting that a charge completion signal output from a second microcomputer is turned off, and to turn on again the charge mode signal when the charge mode signal is turned off by the first microcomputer before detection that the charge completion signal is turned off; and
controlling the second microcomputer to charge the battery based on power supplied from the outside power supply via the charge cable upon detection that the charge mode signal is turned on by the first microcomputer, and to turn off the charge completion signal when the charging is complete.

7. The method for controlling charging of a battery according to claim 6, wherein a state of the charge completion signal is memorized in a memory by the first microcomputer, and the charge mode signal is turned on again by the first microcomputer when the state of the charge completion signal memorized in the memory is detected in "on" state by the first microcomputer after the charge mode signal is turned off by the first microcomputer.

8. The method for controlling charging of a battery according to claim 6, wherein upon detection by the second microcomputer that the state of the charge completion signal is detected in "on" state after the charge mode signal is turned off by the first microcomputer, a switch circuit provided in a signal line for the signal output from the signal generating unit is driven by the second microcomputer so as to switch the state of the signal output from the signal generating unit.

* * * * *